United States Patent [19]

Rudloff

[11] 3,928,693

[45] Dec. 23, 1975

[54] COMPOSITE ARTICLE OF FIBERS AND RESINS

[76] Inventor: Bernard Rudloff, Marckolsheim (Bas-Rhin), France

[22] Filed: Sept. 19, 1973

[21] Appl. No.: 398,766

Related U.S. Application Data

[62] Division of Ser. No. 87,605, Nov. 6, 1970.

[52] U.S. Cl. .................. 428/74; 264/113; 264/122; 428/76; 428/282; 428/498; 428/526
[51] Int. Cl.² ........................ B32B 1/04; B32B 3/02
[58] Field of Search ......... 161/87, 95, 96, 143, 144, 161/155, 156, 158, 170, 245, 246, 257, 259, 260, 262, 264; 117/21, 25, 28, 140 A; 264/112, 113, 122

[56] References Cited
UNITED STATES PATENTS

| | | | |
|---|---|---|---|
| 1,998,827 | 4/1935 | Worrell et al. | 161/95 X |
| 3,121,656 | 2/1964 | Gluck | 161/158 |
| 3,200,181 | 8/1965 | Rudloff | 264/122 X |
| 3,393,117 | 7/1968 | Zolg et al. | 161/96 X |
| 3,542,633 | 11/1970 | Goldsmith | 161/87 |
| 3,671,372 | 6/1972 | Hoffman | 161/95 X |

*Primary Examiner*—W. J. Van Balen
*Attorney, Agent, or Firm*—Ernest G. Montague; Karl F. Ross; Herbert Dubno

[57] ABSTRACT

A composite article has a body constituted by one or more fiber layers which are permeated by two resins of different melting and curing points in nonoverlapping ranges, one resin forming a coating around the body on account of having been melted under pressure at a temperature above the curing point of the other resin.

1 Claim, No Drawings

COMPOSITE ARTICLE OF FIBERS AND RESINS

This application is a division of my co-pending patent application, Ser. No., 87,605, filed Nov. 6, 1970.

The present invention relates to composite articles of stratified materials.

In my prior U.S. Pat. No. 3,200,181 I have disclosed a process for impregnating a loose felt or other layer of fibers uniformly with synthetic-resin powders. The synthetic-resin powders are finely subdivided and coat the fibers and adhere thereto. The loose felt or layer can be compressed by rolling to form a sheet. The sheet formed as a consequence of the rolling operation can be obtained in different thicknesses and with different weights per square meter. This sheet may then be heated by passage on a pair of foraminous conveyor belts through a tunnel wherein polymerization occurs as a consequence of the heating. The conveyor belts maintain the sheet under a slight pressure at the desired uniform thickness. Hot air is passed through the sheet, heating the sheet and causing polymerization of the resin and thereby bonding the fibers to one another. The sheet is thus transformed into a firm felt, whose flexibility and elasticity can be regulated at will according to the quantity of the resins charged to the fibers.

It is also known that several types of resins having different melting points can be incorporated in the same manner in the sheets of fibers, and in general it is possible to incorporate therein any desired substance in very finely ground powder form, such for example as fire-proofing agents, mineral ores, or asbestos or stone dusts.

SUMMARY OF THE INVENTION

The object of my present invention is to provide both rigid and flexible stratified shaped fiber-reinforced plastic articles. These are produced by impregnating a layer of fibers with at least two different resins in powder form, the first of these comminuted resins melting and curing at a temperature between about 60°C and 100°C; the second resin melts and cures at a temperature between about 110°C and 200°C, under an elevated pressure ranging between about 400 and 600 kg. per sq. cm. Heating the resulting impregnated fiber sheet to the curing temperature of the first resin powder strengthens it sufficiently to let it be cut and handled without disintegration so that sections of various shapes can be produced therefrom. These sections can then be solidified by heating to the hardening temperature of the second resin while applying the aforementioned elevated pressure and then cooling same to form a stratified, shaped, fiber-reinforced plastic article.

SPECIFIC DESCRIPTION

The fibers utilized for reinforcement may be of any kind and of any origin. This includes the wide variety of synthetic fibers, naturally occurring fibers, shredded waste, etc. Cotton fibers are particularly preferred.

Any resin powder having the characteristics specified, i.e. the ability to harden on being heated to a temperature of 60°–100°C or at elevated pressure in a range of 110°–200°C, may be used in this process. Particularly preferred resins among those that flow and harden in the lower temperature range are rosin (colophony), esterified rosins, and coumarone resin. The resins with higher melting or polymerization point may be of either the thermosetting or the thermoplastic type. The thermosetting resins cross-link when heated to temperatures of between 140°C and 200°C in the pressure range referred to. The preferred thermosetting resins are the phenolic resins, e.g. phenol-formaldehyde resins, and the urea-formaldehyde resins. The useful thermoplastic resins are those which will fuse at a temperature between about 110°C and 140°C at the high pressures specified. The preferred thermoplastic resins are the polyvinyl chloride resins (homopolymers and copolymers) and the various natural and artificial rubbers, e.g. the natural latex product or elastomeric styrene-butadiene. The flexible thermoplastic resins, such as plasticized polyvinyl chloride, and the various elastomer (rubbery) polymers are particularly useful when manufacturing a flexible article by the process of my present invention.

The operations of impregnating a layer of fibers with the powdered resins and then heating to a temperature between 60°C and 100°C to harden the lower-temperature resin and provide strength and coherency to the impregnated layer of fibers is preferably carried out as disclosed in my U.S. Pat. No. 3,200,181, except that the temperature employed at this stage is lower than the temperatures disclosed in my prior patent. The fiber sheets which have been pre-polymerized (or partially polymerized) as aforesaid are cut to form shaped sections of a size and shape determined by the finished articles desired. These shaped sections are then placed in a mold, preferably a two-part mold which may be heated by such means as electric resistors imbedded therein or by hot circulating fluid. Pressure is preferably generated by compressing the mold between the plates of a hydraulic press. The fiber sheet of a portion thereof which is to form the desired shaped section is placed in the mold. The shaped section need not necessarily conform to the desired shape of the final product.

In practicing my invention I may impregnate a fiber sheet with esterified rosins (colophonies) having a melting point of 60°C which permit obtaining a sufficiently firm and stable resin-impregnated fiber sheet with a first polymerization at a low temperature, e.g. of 60°C. The higher-melting resin powder utilized is a thermosetting phenolic resin.

It is of course also possible to incorporate coloring agents in powder form in the resins, or to utilize colored resins, to produce colored stratified articles. It is also possible to add to the powders, in the impregnation step fire-proofing agents, fungicides, germicides, and other suitable substances or agents with the purpose of imparting selected properties to the final stratified articles according to the uses for which they are intended.

An advantage of the process of the present invention resides in the facility of obtaining objects of shapes having very accentuated reliefs or very pronounced cavities, as a result of the great flexibility of the basic fiber sheet impregnated with the resin powders, which permits the mass to follow all the curves of the molds without being torn or crumpled. Moreover, the molds may be readily designed like those which are utilized for stamping or cold forming.

The novel stratified articles of the present invention may be subjected to all conventional machining operations. They may be bonded in the hot or cold state and onto any desired support. It is also possible to add any lining, e.g. of paper, cloth, or metal by placing the lining sheet in the mold with a view to modifying the final appearance of the object or material produced by the process.

The stratified materials and objects manufactured in accordance with the present invention may be surface treated in a subsequent operation, as are other stratified materials in general, for example by means of coatings of paint, lacquer, PVC coatings, glues, adhesives and the like.

The stratified articles realizable by my improved process are useful in varied industries such as, for example, in the manufacture of furniture, toys, packages, automobiles, insulation for electrical apparatus, household appliances, and small mechanical elements. Flexible stratified articles such as floor carpets or conveyor belts may be produced by using comminuted elastomers such as flexible PVC or the rubber polymers (including latex in powder form), in place of the thermosetting resins mentioned hereinbefore. The process also enables corrugating one or both of the surfaces of the article.

The invention is further illustrated in the following example:

A fiber sheet was impregnated with 7% by weight, relative to the weight of the fibers, of esterified rosin and with 23% by weight relative to the weight of the fibers, with a phenolic known as "Novolak" (phenol-formaldehyde with 6% hexamethylene tetramine). A strengthened fiber sheet was prepared by the process disclosed in my prior U.S. Pat. No. 3,200,181, except that the mixture was heated only to a temperature of 70°C. The partially polymerized (prepolymerized) sheet was cut into tablets having a diameter of 500 mm. These tablets were placed in divided molds on a hydraulic press and heated to a temperature of 180°C with an applied average pressure of 400 kg. per square cm for 2 minutes. The temperature and pressure were applied simultaneously. The mold was then opened and the finished article was allowed to cool in ambient air. The product was a rigid stratified cylindrical fiber-reinforced plastic article having a brilliant aspect.

As a result of the simultaneous application of pressure and temperature, the phenolic resins fuse and flow out toward the exterior. The fibers are completely encased in an exuded portion of these resins and not visible on the surface. Thus one obtains a stratified product internally reinforced with fibers. The outer surface preferably does not contain any reinforcing fibers.

The finished article may also be subjected to forced cooling by means of any appropriate continuous or discontinuous ventilation system.

An advantage of the process is its great economy. It permits the manufacture of articles in which the percentage by weight of the resins in relation to the total weight of the stratified finished article is low e.g. about 20%, whereas the fiber-reinforced sheet materials produced heretofore are composed of 80 to 90% resin. The process of the present invention also permits the manufacture of products of very great uniformity.

While I have disclosed one embodiment of the present invention, it is to be understood, that this embodiment is given by example only, and not in a limiting sense.

I claim:

1. A composite article comprising at least one layer of fibers permeated by a mixture of a rosin with a curing temperature in a range of about 60° to 100°C and a phenol-formaldehyde polymer whose melting point under a pressure of about 400 to 600 kg/cm$^2$ is in a range of about 110° to 200°C, said layer being encased in said polymer.

* * * * *